Patented Jan. 15, 1924.

1,481,003

UNITED STATES PATENT OFFICE.

RALPH E. GEGENHEIMER, OF NIAGARA FALLS, NEW YORK, ASSIGNOR TO THE MATHIESON ALKALI WORKS, INC., OF NEW YORK, N. Y., A CORPORATION OF VIRGINIA.

HYPOCHLORITE COMPOSITION.

No Drawing. Application filed July 12, 1922, Serial No. 574,554. Renewed August 8, 1923.

*To all whom it may concern:*

Be it known that I, RALPH E. GEGEN-HEIMER, a citizen of the United States, residing at Niagara Falls, in the county of Niagara, State of New York, have invented certain new and useful Improvements in Hypochlorite Compositions; and I do hereby declare the following to be a full, clear, and exact description of the invention, such as will enable others skilled in the art to which it appertains to make and use the same.

This invention relates to a new and improved hypochlorite composition of a stable character adapted for use to give solutions of sodium hypochlorite of definite or predetermined strength.

The new composition of the present invention is made up of an intimate mixture of a solid stable calcium hypochlorite and sodium carbonate in reacting proportion such that, when added to water, the calcium hypochlorite and sodium carbonate will react to give a solution of sodium hypochlorite, with precipitation of calcium carbonate. Such a solution may contain a small amount of free alkali, originally present in the calcium hypochlorite as free lime. The presence of this free alkali is not objectionable for most purposes, such as general disinfecting in dairies and households, or for bleaching and, in fact, some alkalinity is desirable as an acid solution is unstable.

The new composition may also be made such that it will give a perfectly neutral solution, or one containing a definite small amount of free alkali. Where such a perfectly neutral solution is desired, or one containing such a definite small amount of free alkali (e. g. for surgical use) there is added to the mixture of the solid stable calcium hypochlorite and sodium carbonate another constituent or constituents such as solid dry sodium bicarbonate, boric acid etc. which will react with the free alkali and reduce the caustic alkalinity to the desired concentration.

Solutions of sodium hypochlorate containing about 5 grams of available chlorine per liter came into very general use in surgery during the war period. The technique in the application of this solution called for the use of hypochlorite solutions of very exactly adjusted strength and of definite alkalinity. Such solutions can be made by treatment of a bleaching powder solution with sodium carbonate, with precipitation of calcium carbonate and the production of a solution of sodium hypochlorite, the alkalinity being adjusted by neutralizing with acid or by addition of sodium bicarbonate. Owing to the instability and variability of bleaching powder, a variable quantity of the bleaching powder is required for making such solutions. Even where the bleaching powder and sodium carbonate are provided in sealed glass capsules, each containing the requisite amount, and the contents of the two capsules added to a fixed amount of water, difficulty is experienced, owing to the instability of the bleaching powder and consequent decomposition in the sealed capsules prior to use.

The improved composition of the present invention is one of a stable character. The calcium hypochlorite used is a concentrated or substantially pure product in the form of a dry powder and relatively much more stable than bleaching powder. Its stability, moreover, is not affected by mixing it with dry sodium carbonate, sodium bicarbonate, boric acid, etc. Accordingly, the calcium hypochlorite and other constituents may be mixed in powdered form and in predetermined amounts, and by adding a definite amount of this mixture to a definite amount of water, a solution of definite strength of sodium hypochlorite can be produced. The new composition can be provided and used in powdered form, or it may be compressed into tablets of definite and predetermined weight. The powder or the tablets, etc. are of a stable character and merely require dissolving in water, together with settling out of the precipitated calcium carbonate formed in the reaction, where this precipitate is not desired in the solution to be used.

The stable calcium hypochlorite product can be produced, for example, as described in the joint application of Taylor, Gammal and Gegenheimer, Serial No. 546,854, filed Mar. 25, 1922. The stable calcium hypochlorite can be made, for example, by the following steps, namely, the preparation of an aqueous solution of hypochlorous acid, for example, by adding chlorine to water containing ground limestone or precipitated chalk in suspension; the removal of hypochlorous acid from such aqueous solution without removal of calcium chloride, for example, by extracting the hypochlorous acid with a suitable solvent, such as carbon tetrachloride containing 2% by volume of ethyl alcohol; the reaction of the hypochlorous acid so extracted, with lime to form calcuim hypochlorous, for example, by treating the solution of the hypochlorite with an excess of hydrated lime containing a small amount of water; the extraction of the calcium hypochlorite with water to form a concentrated aqueous extract; and the evaporation of the aqueous solution to give the dry solid calcium hypochlorite.

In making the new composition the dry powdered calcium hypochlorite and the sodium carbonate and other constituents, if any, can be mixed in a powdered state and in predetermined proportions, for example, in reacting proportions, or with an amount of bicarbonate or boric acid to give a definite alkalinity to the solution when the composition is dissolved in water. Owing to the stable character of the ingredients and their definite composition, the mixture can be subdivided into unit amounts, that is, into tablets or capsules, etc. containing a definite amount of the composition which, when added to a definte amount of water, will give a solution of the desired strength.

The new composition is available for use generally where solutions of sodium hypochlorite are desired and enables solutions to be produced of a desired or predetermined strength. The composition can thus be used in making the so-called Dakin solutions, or for making solutions for other purposes, such as disinfection of milk cans or other receptacles, use in laundries, for textile bleaching, etc., as well as for medical and pharmaceutical purposes.

It will thus be seen that the present invention provides a new and valuable product in powdered form or as pellets, etc. which is stable in character and enables definite and accurate amounts of a composition to be used and solutions of definte and predetermined strength to be readily produced.

I claim:

1. A composition comprising stable calcium hypochlorite and sodium carbonate admixed in reacting proportions.

2. A composition comprising stable calcium hypochlorite and sodium carbonate admixed in reacting proportions, said composition being in the form of pellets or tablets containing predetermined amounts of the ingredients, which, on addition to a predetermined amount of water, will give a solution of predetermined strength of sodium hypochlorite.

3. A composition comprising stable calcium hypochlorite, sodium carbonate and an alkalinity reducing ingredient.

4. A composition comprising stable calcium hypochlorite, sodium carbonate and a small amount of sodium bicarbonate, said composition being adapted, when added to water, to give a solution of exact neutrality or adjusted alkalinity.

In testimony whereof I affix my signature.

RALPH E. GEGENHEIMER.

---

Certificate of Correction.

It is hereby certified that in Letters Patent No. 1,481,003, granted January 15, 1924, upon the application of Ralph E. Gegenheimer, of Niagara Falls, New York, for an improvement in "Hypochlorite Compositions," errors appear in the printed specification requiring correction as follows: Page 1, line 47, for the misspelled word "hypochlorate" read *hypochlorite;* page 2, line 8, for the words "calcuim hypochlorous" read *calcium hypochlorite;* same page, line 48, for the misspelled word "definte" read *definite;* and that the said Letters Patent should be read with these corrections therein that the same may conform to the record of the case in the Patent Office.

Signed and sealed this 18th day of March, A. D., 1924.

[SEAL.]

KARL FENNING,
*Acting Commissioner of Patents.*